United States Patent
Pepin

(10) Patent No.: US 9,442,245 B2
(45) Date of Patent: Sep. 13, 2016

(54) LIGHT SCAFFOLD ELECTRIC ARC SOUND EFFECT

(71) Applicant: Norman Napaul Pepin, Sherwood Park (CA)

(72) Inventor: Norman Napaul Pepin, Sherwood Park (CA)

( * ) Notice: Subject to any disclaimer, the term of this patent is extended or adjusted under 35 U.S.C. 154(b) by 142 days.

(21) Appl. No.: 14/209,913

(22) Filed: Mar. 13, 2014

(65) Prior Publication Data
US 2015/0260386 A1  Sep. 17, 2015

(51) Int. Cl.
| | |
|---|---|
| F21V 7/04 | (2006.01) |
| H01L 33/00 | (2010.01) |
| F21V 8/00 | (2006.01) |
| F21V 33/00 | (2006.01) |
| F21S 10/06 | (2006.01) |
| H05B 33/00 | (2006.01) |
| A63J 5/02 | (2006.01) |
| F21Y 113/00 | (2016.01) |
| F21Y 101/02 | (2006.01) |
| F21W 121/00 | (2006.01) |

(52) U.S. Cl.
CPC ............... *G02B 6/0096* (2013.01); *A63J 5/02* (2013.01); *F21S 10/06* (2013.01); *F21V 33/008* (2013.01); *H05B 33/00* (2013.01); *F21W 2121/00* (2013.01); *F21Y 2101/02* (2013.01); *F21Y 2113/007* (2013.01)

(58) Field of Classification Search
CPC .... G02B 6/0096; F21V 33/008; F21S 10/06; H05B 33/00; A63J 5/02; F21Y 2113/007; F21Y 2101/02; F21W 2121/00
USPC .......... 362/555, 551, 559, 574, 171
See application file for complete search history.

(56) References Cited

U.S. PATENT DOCUMENTS

| | | | |
|---|---|---|---|
| 2,851,311 A | 9/1958 | Gibbs | |
| 4,702,553 A | 10/1987 | Buchmuller | |
| 5,271,482 A | 12/1993 | Walz | |
| 5,488,666 A | 1/1996 | Greenhalgh | |
| 5,588,736 A * | 12/1996 | Shea, Sr. ............... | A42B 3/044 362/106 |
| 5,998,925 A * | 12/1999 | Shimizu ............ | C09K 11/7767 257/103 |
| 6,034,481 A * | 3/2000 | Haynes ................ | G09G 3/30 315/169.1 |
| 6,270,229 B1 | 8/2001 | Chien | |
| 7,344,528 B1 | 3/2008 | Tu et al. | |
| 7,580,232 B2 | 8/2009 | Caggiano et al. | |
| 8,223,466 B2 | 7/2012 | Roscoe | |
| 2004/0144005 A1 | 7/2004 | Young | |
| 2007/0069635 A1* | 3/2007 | Cok ................... | H01L 27/322 313/504 |
| 2010/0002450 A1* | 1/2010 | Pachler .............. | H01L 33/58 362/311.02 |
| 2011/0103045 A1* | 5/2011 | Shay .................. | F21L 4/005 362/157 |
| 2012/0180180 A1 | 7/2012 | Steve et al. | |

(Continued)

FOREIGN PATENT DOCUMENTS

| | | |
|---|---|---|
| CA | 2541640 | 3/2006 |
| CA | 2652007 | 5/2007 |

(Continued)

*Primary Examiner* — Anh Mai
*Assistant Examiner* — Glenn Zimmerman
(74) *Attorney, Agent, or Firm* — Richard D. Okimaw

(57) ABSTRACT

A system for simulating an electric arc for use in models comprises a light source having a light output envelope and a light scaffold extending from the light source, wherein light output from the light source is transported along the scaffold to simulate the electric arc. A method for simulating an electric arc comprises emitting light through the light source wherein light output from the light source is transported along the scaffold to simulate the electric arc. The system may be located at the distal end of an hot stick and may include a switch and a transmitter for initiating a corresponding arc effect in a model.

20 Claims, 4 Drawing Sheets

(56) References Cited

U.S. PATENT DOCUMENTS

2014/0173885 A1* 6/2014 Lai .......................... G02B 7/02
29/593

FOREIGN PATENT DOCUMENTS

| | | |
|---|---|---|
| CA | 2725719 | 12/2010 |
| CA | 2762296 | 12/2011 |

* cited by examiner

LIGHT SCAFFOLD ELECTRIC ARC SOUND EFFECT

BACKGROUND OF THE INVENTION

1. Field of Invention

The present invention relates to the field of sound simulation and light source synchronization. More specifically, the present invention relates to simulation of an electric arc using a light scaffold controlled by an electronic circuit.

2. Description of Related Art

Model building is a hobby that involves the creation of models either from kits or from other materials acquired by the builder and can include modeling such as model aircraft, model cars, building models, rail transport modeling, and other types of architectural models. Many different types of light effects can be used in models, including simulators, booster boards and super flashers. For example, simulators are used to replicate the heat source glow seen in furnaces, mimic the crackling fire in a fireplace, emulate the sparks created by pickups as electric locomotives move along the rails, reproduce the effect of a flickering or defective light as well as provide arc and gas welding that reproduces the varying intensity, intermittence and slight color changes just like real welding.

An electric arc is created when a sustained electric current passes from one solid electrical conductor to another through air or other gas. The gas in between the conductors (or electrodes) becomes ionized and thereby produces light and heat. A model or the like created to show electrical hazards would benefit from the simulation of an electric arc without actually creating the electrical arc. Additionally, the effectiveness of the model for pointing out electrical hazards would be greatly enhanced by an acoustically realistic sound that is similar to a high voltage electric arc.

In the electric industry, lineman and maintenance workers use an hot stick to move high voltage wires, reset high voltage switches and circuit breakers, etc. Using the hot stick provides a safe distance and insulation against a lethal electric shock. A model display or the like created to show electrical hazards could benefit from the use of an hot stick that would generate an arc effect in order to show anywhere on the model display where there is an electrical hazard risk.

SUMMARY OF THE INVENTION

It is the object of the present invention to meet these needs by providing a sound simulation and light source synchronization to simulate a sustained high voltage electric arc as well as an electronic hot stick used to point out electrical hazard risks in a model display or the like. The present invention uses a light scaffold to simulate the high voltage electric arc. The effectiveness of a light scaffold to simulate a sustained high voltage electric arc is greatly enhanced with an electronic circuit that generates an audio signal that when amplified and played through a loudspeaker or loudspeakers, results in an acoustically realistic sound that is similar to a high voltage electric arc. The electronic circuit of the present invention also controls one or more light sources to illuminate the light scaffold such that the light source or sources are pulsed on and off synchronously with the audio signal.

In one embodiment of the present invention, a system for simulating an electric arc for use in models and the like is disclosed. The system comprises a light source having a light output envelope and a light scaffold extending from the light source, wherein light output from the light source is transported along the scaffold to simulate the electric arc.

The light source may be a blue emitting LED with a dominant light output of about 465 nm. The blue emitting LED may include a 3 mm clear lens and have a viewing angle of about 20 degrees to about 45 degrees. The blue emitting LED may be effective in illuminating the light scaffold up to about 2 cm in length.

The light scaffold may be shaped to depict a desired type of electric arc wherein the light scaffold is physically designed to reside within the light output envelope. The light scaffold may comprise a translucent material. An outer surface of the light scaffold may be textured for diffused reflection and transmission of light.

The system may further comprise an audio signal sound effect to enhance the simulated electric arc. The system may further comprise a control unit to synchronize light output from the light source with the audio signal sound effect.

A further embodiment of the present invention discloses a method of simulating a high voltage electric arc for use in models and the like. The method comprise emitting light through a light source having a light output envelope and a light scaffold extending from the light source, wherein light output from the light source is transported along the scaffold to simulate the electric arc.

The light source may be a blue emitting LED with a dominant light output of about 465 nm. The blue emitting LED may include a 3 mm clear lens, have a viewing angle of about 20 degrees to about 45 degrees, and be effective in illuminating the light scaffold up to about 2 cm in length.

The light scaffold may be shaped to depict a desired type of electric arc wherein the light scaffold is physically designed to reside within the light output envelope. The light scaffold may comprise a translucent material, wherein an outer surface of the light scaffold is textured for diffused reflection and transmission of light.

The method may further comprise enhancing the simulated electric arc with an audio signal sound effect. The method may further comprise synchronizing light output from the light source with the audio signal sound effect.

A further embodiment of the present invention discloses an hot stick for simulating an electric arc hazard for use in models and the like. The hot stick comprises a cylindrical tube having a proximal end and a distal end, a transmitter inside the hollow cylindrical tube, the transmitter being adapted to output a signal to turn on a corresponding simulated electric arc on the model and a switch on the proximal end of the tube, wherein the switch turns the transmitter on and off. The hot stick further comprises a light source having a light output envelope on the distal end of the tube and light scaffold extending from the light source, wherein when the switch turns the transmitter on, wherein light output from the light source is transported along the scaffold for simulating the electric arc.

The transmitter may initiate an audio signal sound effect synchronized with the simulated electric arc. The light scaffold may include an orange light source to emulate heat buildup when the switch is turned on; and wherein the light scaffold orange glow slowly fades to emulate cooling off when the switch is turned off.

The hot stick may comprise a bi-color blue and white LED, wherein the hot stick simulates a low voltage electric arc hazard by flashing the light from the white LED when the switch is pressed for less than about 400 ms; and wherein the hot stick simulates a high voltage arch hazard by sustaining the light from the blue LED when the switch is pressed for more than about 400 ms.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
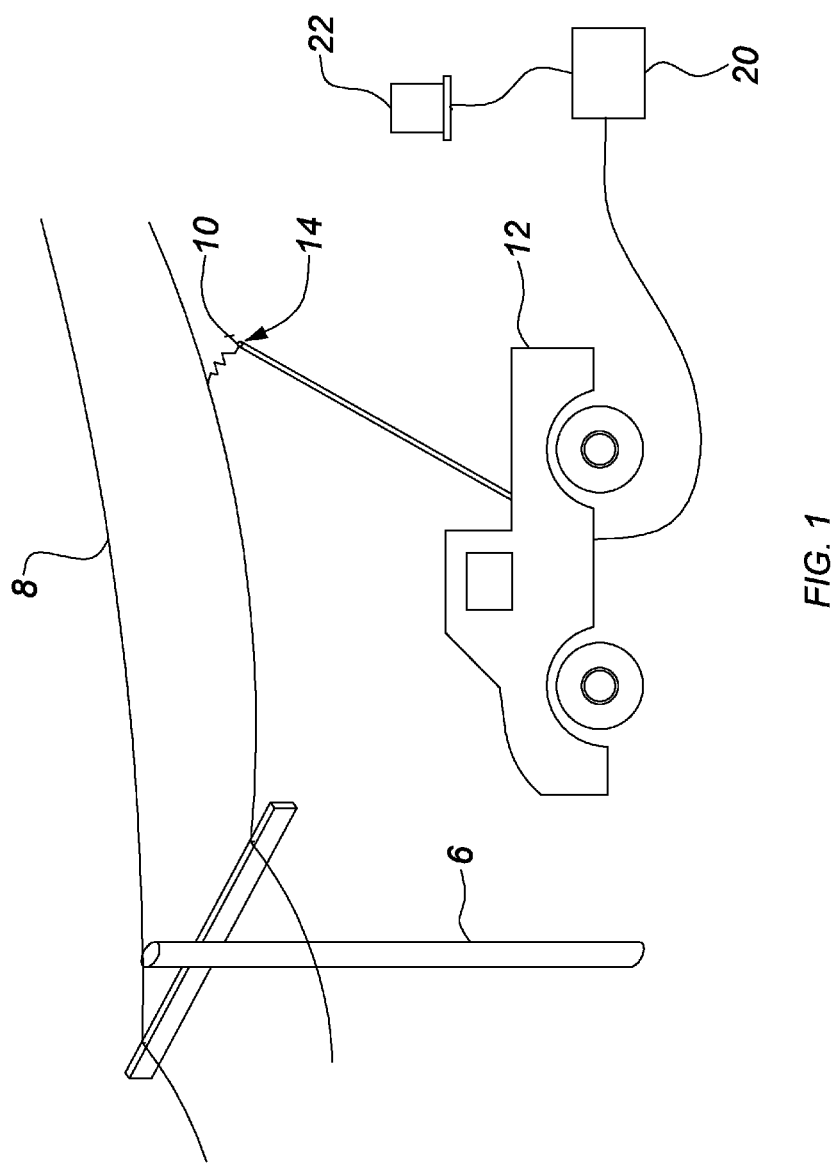
FIG. 1 is a perspective view of a model having a simulated arc effect.

Referring to FIG. 1, a model having an apparatus for simulating an electric arc according to a first embodiment of the invention is shown generally at 10. As illustrated in FIG. 1, the model may include a simulated electrically charged body, such as, by way of non-limiting example, a simulated power line 8 supported by a plurality of poles or towers 6 as are commonly known. The model includes an apparatus 10 at an end of a ladder or the like which is adapted to provide a simulated electrical arc as desired by a user. As illustrated in FIG. 1, the apparatus 10 may be located at the end of a model component, such as by way of non-limiting example a model truck 12 or the like and is located at an arc location 14 such that the model may illustrate the potential electric arc which can occur between the potential arc location 14 and the power line. In such a way, the model may demonstrate to a user the potential arc which may be created at such location.

Figure 3:
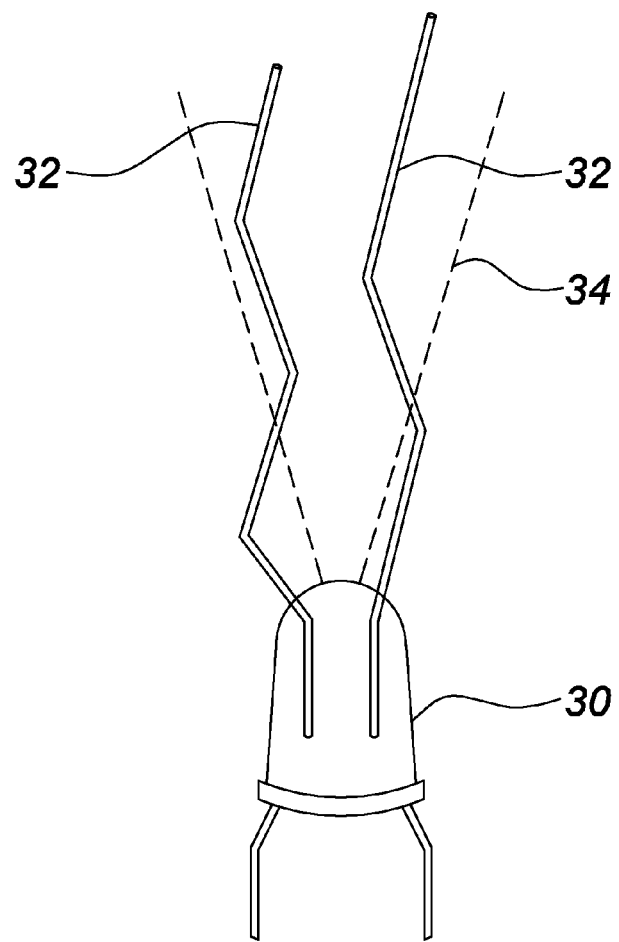
FIG. 3 is an illustration of the high voltage arc light scaffold of FIG. 1.

Turning to FIG. 3, the apparatus comprises a light source 30 having a plurality of light scaffolds 32 extending proximate thereto shaped to emulate an electric arc in a particular moment of time. As used herein the term light scaffold is a physical structure which provides a structure which may display and diffuse light which is adapted to glow or provide a structure from which light emanates therefrom. As illustrated in FIG. 3, the light source 30 includes a light envelope 34 within which the light is emitted. The light structure 32 is physically designed to reside within the light envelope. By way of non-limiting example, a 3 mm clear lens, blue emitting LED with a viewing angle of about 20 to about 45 degrees is effective in illuminating a light scaffold up to 2 cm in length may be a suitable light source although other light sources may also be useful. A light source with greater light output may allow for longer light scaffolds to be illuminated. Although light source intensity is important in its ability to illuminate the light scaffold while color purity and wavelength is also important. To clarify further, utilization of a blue light source such as an LED with a dominant light output or 465 nm is more effective than an LED with a white light output.

The light scaffold is constructed of translucent material or transparent material which has had its outside surface textured such that diffuse reflection and diffuse transmission result. The combination of these characteristics (when optimized) result in effective illuminating of the light scaffold. Materials that are translucent will exhibit some degree of diffuse reflection but usually lack internal subdivision to maximize illumination. Therefore, texturing the outer surface is effective. The light scaffold is shaped to depict the desired type of ARC. In this example, 0.7 mm plastic fiber optic strand has had its surface textured with #400 sandpaper. The fibers are then heated for the purpose of bending each strand to the desired shape. The shape of the light scaffold should be such that the material is kept within the light output envelope. In this example, the LED exhibits a blue light emission with a viewing angle of 20 degrees. The light scaffold can be made from materials such as polyethylene terephthalate or polycarbonate.

Also illustrated in FIG. 1 is a system utilizing the apparatus 10 which includes the model along with a processing circuit 20 and a button 22. In the present embodiment, the processor circuit includes a microprocessor or other suitable processor circuit as are generally known in the art. More generally, in this specification, including the claims, the term "processor circuit" is intended to broadly encompass any type of device or combination of devices capable of performing the functions described herein, including (without limitation) other types of microprocessors, microcontrollers, other integrated circuits, other types of circuits or combinations of circuits, logic gates or gate arrays, or programmable devices of any sort, for example, either alone or in combination with other such devices located at the same location or remotely from each other, for example. Additional types of processor circuits will be apparent to those ordinarily skilled in the art upon review of this specification, and substitution of any such other types of processor circuits is considered not to depart from the scope of the present invention as defined by the claims appended hereto. In operation, a user presses the button 22 which is in communication with the processing circuit 20. The processing circuit 20 thereafter is adapted to activate the light source thereby creating the arc effect.

Figure 2:
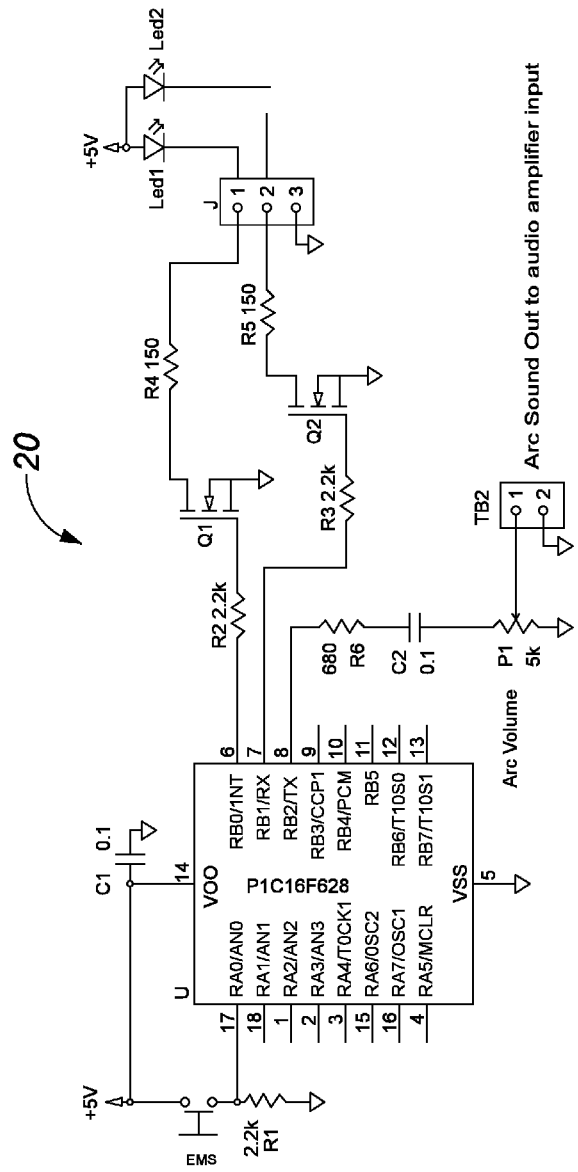
FIG. 2 is a schematic diagram for a high voltage arc simulation

Turning now to FIG. 2, an exemplary electric circuit which fulfills the basic requirements of both electric arc sound simulation and synchronized light source control to achieve a simulated high voltage electric arc is illustrated. It will be appreciated that other electric circuits, processors and control systems may be utilized to achieve the functions set out above. The circuit is comprised mainly of a PIC (peripheral interface controller—PIC16F628A by Microchip), two N-channel mosfets, six resistors, two capacitors, two terminal blocks, a switch and the light sources.

The processor circuit 20 may be configured to control the operation of the light source such that when switch SW1 is closed, pin 8 generates a digital signal at a frequency and pattern that when amplified and played through a loudspeaker, sounds similar to a high voltage electric arc. The circuitry that includes R6, C2 and P1 serve to decouple any DC voltage and allow the audio signal to be attenuated (volume controlled) via P1, a potentiometer. Pulses are generated from pins 6 and 7 in order to illuminate the LED light source(s). The pulsed outputs bias the gates of the N-channel mosfets thought resistors R2 and R3 which results in each mosfets' source pin sinking current and thus the LED cathodes go low. The current through each LED is limited by resistors R4 and R5. The current should not exceed the manufacturer's maximum recommended current for the LEDs chosen.

It will be appreciated that a program may be utilized to configure the PIC and provide timing and output signaling to achieve a realistic appearing high voltage electric arc with synchronized sound. The programming language used may be of any suitable type, such as, by way of non-limiting example Picbasic Pro with a Picbasic Pro Compiler 3.0. The visual high voltage arc effect and synchronized sound may be accomplished within the program such that the duration, repetition pattern and frequency of the light and sound output may be adjusted as desired by a user according to known methods. In particular, the dominant audible frequency that is commonly heard in a mains high voltage electric arc is normally twice the mains operating frequency of 60 hz in North America and accordingly, the frequency of the outputted sound and accordingly, the period of the outputted sounds may also be adjusted to be equal to twice the mains frequency as calculated according to known methods. The program may be designed such that the duration of the pulses appear random in terms of how many pulses are generated with each alternate cycle. Optionally, a plurality of light sources may be utilized which are 180 degrees out of phase with each other to illuminate another light scaffold or create another lighting effect.

It is important to note that the duration of each pulse, the duration of the pulses and the duration of the off times can be adjusted to change the audible pitch and light source pattern to optimize the high voltage arc simulation visual effect and sound.

Figure 4:
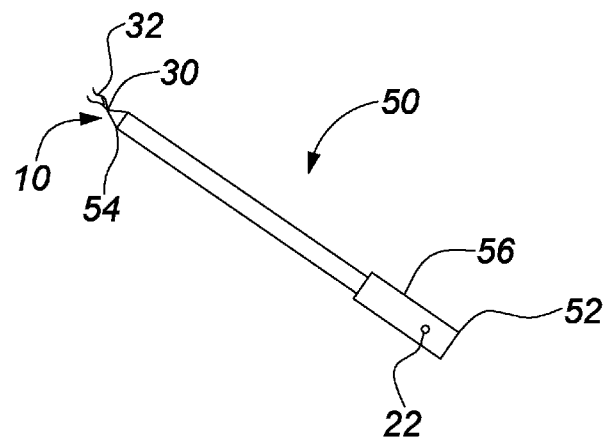
FIG. 4 is an illustration of a hot stick having a simulated arc effect at a distal end thereof.

Turning now to FIG. 4, a hot stick utilizing the above apparatus 10 is illustrated generally at 50. The hot stick 50 comprises an elongate member having the appearance of a hot stick for use in electrical power distribution poles. The hot stick 50 may be formed of any suitable material such as fibreglass plastic or the like and extends between proximate and distal ends, 52 and 54, respectively. The proximate end 52 includes a handle 56 and the button 22 for activating the arc effect. The distal end 54 includes the apparatus 10 for simulating the arc as set out above.

Figure 5:
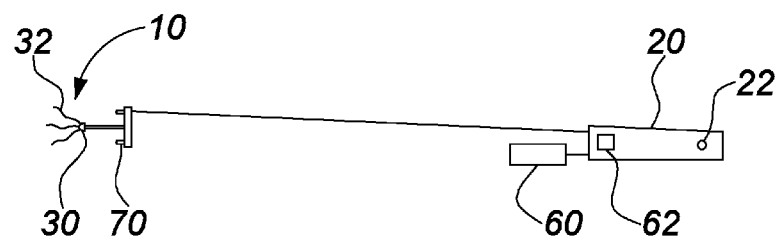
FIG. 5 is a detailed cut away view of the internal components of the hot stick of FIG. 4.

With reference to FIG. 5, the internal components of the hot stick are illustrated wherein the hot stick may include the apparatus 10 for simulating the arc effect along with the processor circuit 20 and a power source such as a battery 60. The hot stick 50 may also include a transmitter 62, such as by way of non-limiting example a radio-frequency (RF) transmitter as are commonly known for transmitting to the model a signal to produce a synchronized audible sound as set out above. As illustrated, the hot stick 50 may optionally include a focused transmitter, such as, by way of non-limiting example, an infrared (IR) transmitter which has a focused or narrow transmission beam such that a beam is emitted therefrom when the button 22 is depressed so as to activate an IR receiver (68 in FIG. 1) at a specified location on the model when the hot stick 50 is aimed at that IR receiver. In such a way, an arc effect may be triggered at that location as well as at the end of the hot stick 50 upon pressing the button 22. Additionally, a orange light source 70 may be included at the distal end of the hot stick 50 which is activated when an arc effect is produced and adapted to slowly fade to simulate a heated surface produced by the arc.

While specific embodiments of the invention have been described and illustrated, such embodiments should be considered illustrative of the invention only and not as limiting the invention as construed in accordance with the accompanying claims.

What is claimed is:

1. A system for simulating an open air electric arc, comprising:
   a light source having a light output envelope; and
   a light scaffold extending from said light source, comprising at least one elongate transparent material extending between proximate and free distal ends and having a high slenderness ratio extending through open air along the length thereof,
   wherein said proximate end of said light scaffold is located within said light output envelope of said light source proximate thereto and wherein said distal end is located distally from said light source,
   wherein said light scaffold extends along an electrostatic discharge shaped path, and
   wherein light output from said light source is transported along said light scaffold to simulate the electric arc.

2. The system of claim 1, wherein said light source is a blue emitting LED with a dominant light output of about 465 nm.

3. The system of claim 1, wherein said light scaffold is shaped to depict a desired type of electric arc wherein said light scaffold is physically designed to reside within the light output envelope.

4. The system of claim 1, wherein said light scaffold comprises a translucent material.

5. The system of claim 1, further comprising an audio signal sound effect to enhance the simulated electric arc.

6. The system of claim 2, wherein said blue emitting LED includes a 3 mm clear lens and has a viewing angle of about 20 degrees to about 45 degrees.

7. The system of claim 4, wherein an outer surface of said light scaffold is textured for diffused reflection and transmission of light.

8. The system of claim 5, further comprising a control unit to synchronize light output from the light source with said audio signal sound effect.

9. The system of claim 6, wherein said blue emitting LED is effective in illuminating the light scaffold up to about 2 cm in length.

10. A method of simulating an electric arc, comprising:
    emitting light through a light source having a light output envelope; and
    transmitting said light from said light from said light source through a light scaffold extending from said light source,
    said light scaffold comprising at least one elongate transparent material extending between proximate and free distal ends and having a high slenderness ratio extending through open air along the length thereof,
    wherein said proximate end of said light scaffold is located within said light output envelope of said light source proximate thereto and wherein said distal end is located distally from said light source,
    wherein said light scaffold extends along an electrostatic discharge shaped path, and
    wherein light output from said light source is transported along said scaffold to simulate the electric arc.

11. The method of claim 10, wherein said light source is a blue emitting LED with a dominant light output of about 465 nm.

12. The method of claim 10, wherein said light scaffold is shaped to depict a desired type of electric arc wherein said light scaffold is physically designed to reside within said light output envelope.

13. The method of claim 10, further comprising enhancing the simulated electric arc with an audio signal sound effect.

14. The method of claim 11, wherein said blue emitting LED includes a 3 mm clear lens, has a viewing angle of about 20 degrees to about 45 degrees, and is effective in illuminating said light scaffold up to about 2 cm in length.

15. The method of claim 12, wherein said light scaffold comprises a translucent material, wherein an outer surface of said light scaffold is textured for diffused reflection and transmission of light.

16. The method of claim 13, further comprising synchronizing light output from said light source with said audio signal sound effect.

17. A hot stick for simulating an electric arc, comprising:
a cylindrical tube having a proximal end and a distal end;
a transmitter inside said hollow cylindrical tube, said transmitter being adapted to output a signal to turn on a corresponding simulated electric arc on a model;
a switch on said proximal end of said tube, wherein said switch turns said transmitter on and off;
a light source having a light output envelope on the distal end of said tube;
a light scaffold extending from said light source, comprising at least one elongate transparent material extending between proximate and free distal ends and having a high slenderness ratio extending through open air along the length thereof,
wherein said proximate end of said light scaffold is located within said light output envelope of said light source proximate thereto and wherein said distal end is located distally from said light source,
wherein said light scaffold extends along an electrostatic discharge shaped path, and
wherein when said switch turns said transmitter on, wherein light output from said light source is transported along said scaffold for simulating the electric arc.

18. The hot stick of claim 17, wherein said transmitter initiates an audio signal sound effect synchronized with said simulated electric arc.

19. The hot stick of claim 17, comprising a bi-color blue and white LED, wherein the hot stick simulates a low voltage electric arc hazard by flashing the light from the white LED when the switch is pressed for less than about 400 ms; and wherein the hot stick simulates a high voltage arc hazard by sustaining the light from the blue LED when the switch is pressed for more than about 400 ms.

20. The hot stick of claim 18, wherein said light scaffold includes an orange light source to emulate heat buildup when the switch is turned on; and wherein the light scaffold orange glow slowly fades to emulate cooling off when the switch is turned off.

* * * * *